US009037405B2

(12) United States Patent
Gourlay et al.

(10) Patent No.: US 9,037,405 B2
(45) Date of Patent: May 19, 2015

(54) SYSTEM AND METHOD OF SENDING AN ARRIVAL TIME ESTIMATE

(75) Inventors: Alastair Gourlay, Boulder Creek, CA (US); Daniel Edward Fink, Berkeley, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 711 days.

(21) Appl. No.: 12/852,751

(22) Filed: Aug. 9, 2010

(65) Prior Publication Data

US 2011/0231091 A1 Sep. 22, 2011

Related U.S. Application Data

(60) Provisional application No. 61/290,574, filed on Dec. 29, 2009.

(51) Int. Cl.
*G01C 21/00* (2006.01)
*G01C 21/26* (2006.01)
*G08G 1/0968* (2006.01)

(52) U.S. Cl.
CPC .... *G08G 1/096844* (2013.01); *G08G 1/096811* (2013.01); *G08G 1/096883* (2013.01)

(58) Field of Classification Search
CPC . G08G 1/123; G08G 1/096811; G06Q 10/08; G01S 5/0027; G01S 2205/008
USPC ......... 701/400, 408–411, 418, 424, 425, 430, 701/451–455, 461, 465–469; 342/386, 387, 342/450–457; 455/422.1, 436, 455/456.1–456.6, 561; 370/230, 335, 370/395.2–395.21, 395.62, 412, 498–509; 367/118, 127
See application file for complete search history.

(56) References Cited

U.S. PATENT DOCUMENTS

| | | | | |
|---|---|---|---|---|
| 5,220,507 | A | 6/1993 | Kirson | |
| 5,523,950 | A | 6/1996 | Peterson | |
| 5,987,377 | A * | 11/1999 | Westerlage et al. | 701/454 |
| 6,209,026 | B1 | 3/2001 | Ran et al. | |
| 6,236,933 | B1 * | 5/2001 | Lang | 701/117 |
| 6,317,686 | B1 | 11/2001 | Ran | |
| 6,738,698 | B2 * | 5/2004 | Ichihara et al. | 701/36 |

(Continued)

OTHER PUBLICATIONS

Extended European Search report mailed Oct. 13, 2010, in corresponding European patent application No. 10172319.5.

(Continued)

*Primary Examiner* — James Trammell
*Assistant Examiner* — Majdi Alsomiri
(74) *Attorney, Agent, or Firm* — Fleit Gibbons Gutman Bongini & Bianco P.L.

(57) ABSTRACT

Aspects provide for a navigation function implemented on a device that has a communication capability (e.g., a mobile phone) in which the navigation function automatically sends an Estimated Time of Arrival (ETA) to a contact associated with a destination selected for navigation purposes. For example, when a user activates a navigation function on his mobile phone, and selects a destination for which a route will be generated from his current location to the destination, a contact phone number associated with that destination will be sent a Short Message System (SMS) message with the calculated ETA. Provisions can be made for automatic updates as the route is traveled. Other information pertaining to the reasons for the ETA can be selected or automatically generated by the navigation function.

19 Claims, 13 Drawing Sheets

(56) References Cited

U.S. PATENT DOCUMENTS

| | | | | |
|---|---|---|---|---|
| 6,801,850 | B1 * | 10/2004 | Wolfson | 701/410 |
| 6,922,629 | B2 * | 7/2005 | Yoshikawa et al. | 701/117 |
| 2004/0107048 | A1 * | 6/2004 | Yokota | 701/211 |
| 2004/0128066 | A1 * | 7/2004 | Kudo et al. | 701/204 |
| 2004/0267440 | A1 * | 12/2004 | DeKock et al. | 701/117 |
| 2005/0143097 | A1 * | 6/2005 | Wilson et al. | 455/456.3 |
| 2005/0165543 | A1 * | 7/2005 | Yokota | 701/204 |
| 2005/0222756 | A1 | 10/2005 | Davis | |
| 2007/0197231 | A1 * | 8/2007 | Lin | 455/456.1 |
| 2008/0103686 | A1 * | 5/2008 | Alberth et al. | 701/200 |
| 2008/0275641 | A1 * | 11/2008 | Cummings | 701/204 |

OTHER PUBLICATIONS

Office Action mailed Apr. 10, 2013, in corresponding Canadian patent application No. 2,724,883.

Decision to grant a European patent pursuant to Article 97 (1) EPC mailed Feb. 16, 2012, in corresponding European patent application No. 10172319.5.

Notice of Allowance and Fee(s) Due mailed Apr. 25, 2014; in corresponding Canadian patent application No. 2,724,883.

* cited by examiner

SYSTEM AND METHOD OF SENDING AN ARRIVAL TIME ESTIMATE

CROSS-REFERENCE TO RELATED APPLICATIONS

This application claims priority from U.S. Provisional Pat. App. Ser. No. 61/290,574, filed on Dec. 29, 2009, entitled "SYSTEM AND METHOD OF SENDING AN ARRIVAL TIME ESTIMATE", the contents of which are incorporated herein in their entirety for all purposes.

BACKGROUND

1. Technical Field

The following relates generally to location based services (LBS) for mobile devices, and in particular to systems and methods for providing navigation information, routes, ETA information, search functionality, and other related functionality on mobile devices.

2. Related Art

Rush hour traffic volume, road construction, vehicular collisions, and roadside emergencies are just a few examples of the various events and circumstances that can cause traffic congestion. Due to the nature of such events traffic congestion can be difficult to predict. Although radio, television, and online news sources can provide traffic information gathered using various techniques such as highway cameras, phone-in traffic tips, satellite imagery, and road sensors; this information is stale and/or inaccurate.

Old or inaccurate traffic information can be troublesome for various reasons. For example, an alternate traffic route, which may be less convenient, is chosen due to a traffic report indicating that a traffic problem exists, which problem has since been alleviated. This can cause a commuter to take a less optimal route, which can waste fuel, cause them to be late, and cause congestion on side-roads. Conversely, a traffic report may indicate that the commuter's route is clear, when in fact an event has, in the meantime, created a traffic jam, since the traffic report is based on information that is not current.

In addition to better data gathering and dissemination about traffic conditions, a variety of applications and enhancements to user interfaces, such as user interfaces that are optimized for mobile devices remain to be realized.

BRIEF DESCRIPTION OF THE DRAWINGS

Embodiments will now be described by way of example, and not limitation, with reference to the appended drawings wherein.

DETAILED DESCRIPTION

Figure 1:
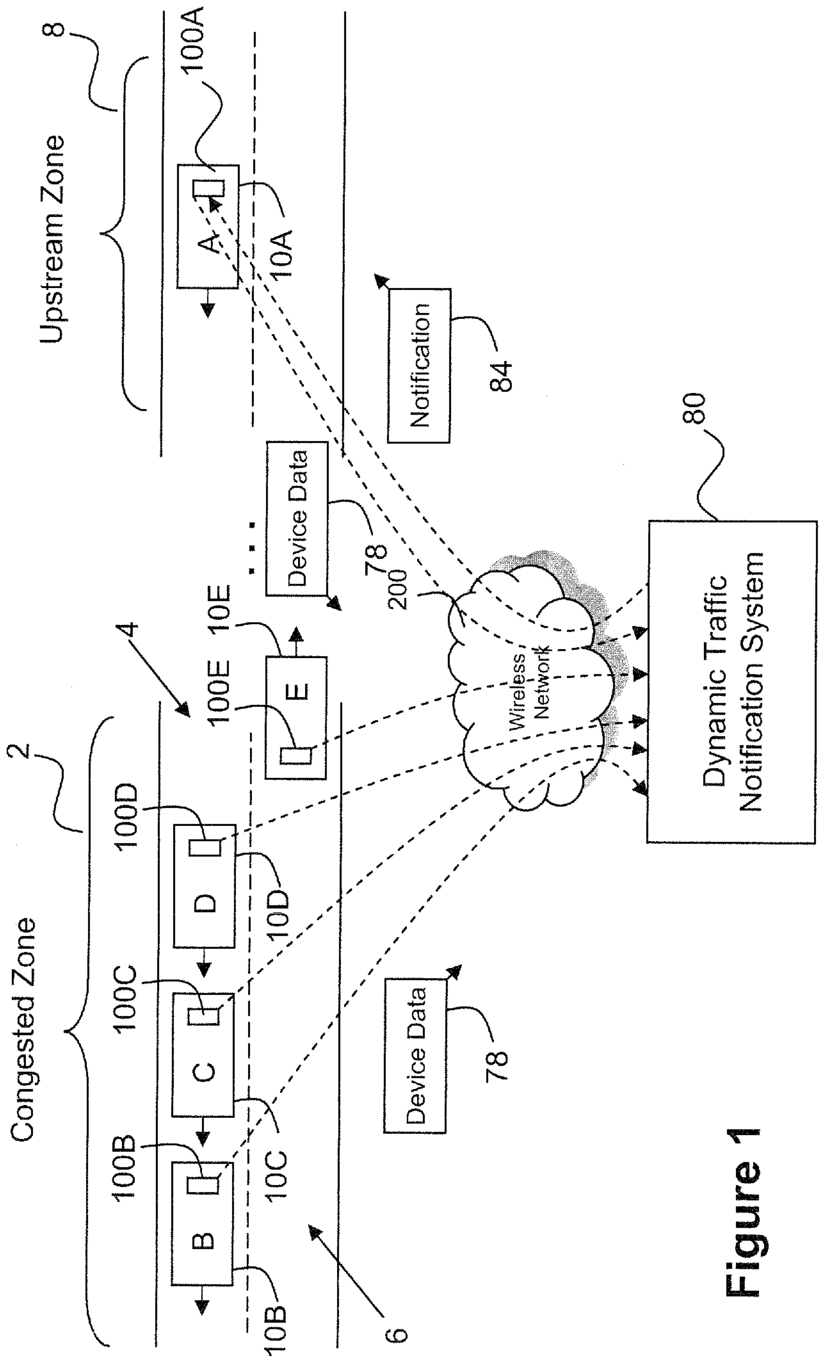
FIG. 1 depicts a schematic diagram illustrating an example of a traffic notification system providing a traffic notification to one mobile device according to data obtained from a plurality of other mobile devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The following table of contents provides a guide to the disclosure, and is organized into sections. First, component technologies and techniques are described, followed by an example architecture in which such component technologies and techniques can be employed, and finally, disclosure of several applications that can be provided in such an architecture, and which can be based on the component technologies and techniques is provided.

The following disclosure relates to a number of topics, as outlined below and addressed in further detail in sections with corresponding headings:

I. Route Representation: Technology for Representation of Routes can be Used in Navigation Supports Navigation Applications and Other Applications.

An object for vehicle navigation is providing a route from an origin to a destination. The route can be roughly defined to include an ordered sequence of roadways that may be traveled to move from the origin to the destination. In general, there will be many (perhaps millions of) possible sequences that may be used to travel between any given origin/destination pair. In practice, there are a relatively small number that are "good" (as defined by some measure or measures, such as shortest, fastest, and more subjective measures such as simplest, least stress, most scenic, and so on). Given a set of conditions, there often can be determined an optimal (best) route to fit a given measure or measures.

For computer-assisted vehicle navigation, a route can be defined relative to a map database. A map database generally comprises an object-based encoding of the geometry, connectivity and descriptive attributes of a collection of roadways, and is usually based on a topological model, such as a 1D directed graph inscribed within a 2D surface sheet. The individual objects in a model of this type include edges that mostly represent roads (such as the centerlines of roads), and nodes that represent locations where roads intersect and cul-de-sacs terminate. A "road" or "roadway" (used interchangeably here) in a map database can be defined in terms of a connected "chain" of edges that share a common name. Most roadways consist of a single connected chain. Some roads are more complicated, for instance, a road may be split in two by another geographic feature such as a river.

Certain non-road features can also be represented by edges, including railroads, streams and rivers, and the boundaries of area objects (faces) such as parks, water bodies, and military bases, as well as boundaries of towns, cities, counties and similar divisions of governmental hierarchy.

The geometry of the database can be represented by coordinate locations (x/y or longitude/latitude points) associated with nodes, and "shape" (often point sequences) associated with edges. The "raw" connectivity of the roadways is represented by the edge/node connectivity that is provided by the directed graph representation: each edge has a specific "from" and "to" node; each node has a list of edges that have the node at either the "from" or "to" end.

Actual road connectivity may be limited by descriptive attributes such as turn prohibitions and travel mode restrictions. Other descriptive attributes can include the road name, legal travel speed and direction (bi-directional or one-way), number of lanes and similar.

Map databases can carry different levels of detail. A fully detailed, or large-scale map database will include everything from the most important long-distance highways to minor back alleys and un-paved country lanes. A sparsely detailed, or small-scale map database can have only the most important highways and connections that allow long distance travel.

Map databases also include varying geographical extents of coverage. Some map databases may cover only a small area. Others may cover entire continents. Often there is an inverse correlation between scale and coverage extent, in that large-scale maps tend to have limited geographic coverage, while continental extent maps may have limited detail. Such a circumstance was particularly true for paper maps (city map vs. road atlas), and is still true in paper-equivalent computer map renderings. A familiar example is the internet-based mapping service: when zooming in on a given displayed map area, more detail and less extent are displayed, and when zooming out, less detail and more extent are displayed.

In fully detailed databases, wide roads and roads with wide medians may also be split lengthwise into two separate one-way chains representing the two independent directions of travel. Many roads are short, consisting of only a single edge. Some roads are very long, spanning from ocean to ocean across a continent, and consisting of thousands of individual edges within a full-detailed representation. Most roads are somewhere between these two extremes.

A route as originally described may therefore be represented as a specific sequence of connected edges within a map database. Given a route with this representation, a variety of properties about the overall route can be determined by inspecting the individual edges. For instance, to determine the length of the route, one can sum the lengths of the individual edges. Similarly, to estimate travel time of a route, one can determine the travel time for each edge (length divided by speed) and accumulate the sum over the whole set. Such a travel time is termed "static", in that it would be based on a fixed representation of speed.

More elaborate results may be determined by examining a route's edge sequence within the context of the containing database. For instance, the list of turn-by-turn instructions that are required to follow a route may be inferred by examining how the route traverses each node relative to the other edges that occur at the corresponding intersection. Some intersection traversals are more important than others, and may warrant explicit identification in a route representation. Other intersections are more trivial; for example, those in which no turn is made. Such intersections may not be explicitly identified in some representations.

II. Traffic and Congestion Technology can be Used for Modeling of Traffic Patterns and Congestion, and can Build on Technology for Route Representation and Support Various Applications, such those Described Herein.

Turning now to FIG. 1, an example zone of traffic is shown, which comprises a traffic "problem" hereinafter named a congested zone 2. The congested zone 2 comprises a "left-bound" lane of traffic 4 (i.e. with respect to the page) and a "right-bound" lane of traffic 6. It can be seen that the congested zone 2 represents a common zone of traffic congestion caused by any one or more traffic events. Another zone of traffic is also shown in FIG. 1 and, in this example, represents an upstream zone 8, which refers to any roadway that is, approaching, expected to connect, lead into, or is simply an upstream portion of a same roadway that includes the congested zone 2. In this example, the upstream zone 8 thus feeds traffic into the congested zone 2 such that at least one mobile device 100 approaching the congested zone 2 can be determined.

In the example shown in FIG. 1, the congested zone 2 at a particular point in time comprises three vehicles travelling left-bound 4, namely vehicles 10B, 10C, and 10D; and comprises a single vehicle 10E travelling right-bound 6. For the present discussion, the congestion occurs in the left-bound lane only whereas vehicle 10E is moving at a normal rate of speed in the right-bound lane. The upstream zone 8, at the same point in time, comprises a single vehicle 10A travelling left-bound 4 towards the congested zone 2. Each vehicle 10A-10E comprises a respective data communications device, hereinafter referred to as a mobile device 100A-100E, which travels with the corresponding vehicle 10A-10E in which it currently resides. As will be explained below, the mobile device 100 can be any suitable device capable of communicating via a wireless network 200. The mobile devices 100 utilize such capability to provide device data 78 to a dynamic traffic notification sub-system 80, via the wireless network 200. The device data 78 comprises information related to the location and speed of the vehicle 10, as measured by, or obtained by or from another source, the mobile device 10 located and travelling within the vehicle 10. For example, mobile device 100B in vehicle 10B may utilize a GPS function to measure the speed of the vehicle 10B and the current location, prepare device data 78, and send the device data 78 to the dynamic traffic notification sub-system 80, hereinafter referred to as "the notification sub-system 80" for brevity.

As will also be explained below, the notification sub-system 80 uses device data 78 from a plurality of mobile devices 100 to dynamically determine traffic conditions, such as the development of the congested zone 2, in order to prepare a notification 84 that can be sent to a mobile device 100 that is expected to be headed towards the congested zone 2.

III. Building and Using a Traffic Congestion Model.

Commute traffic congestion tends to follow very reliable patterns. For example, a given stretch of heavily used freeway at 7:30 AM every weekday morning, would be expected to have traffic moving much slower than during normal "free-flow" conditions. Within that basic model, more refined patterns can be found. For example, it can be found that traffic may be heaviest on Monday (33 mph average), a little lighter Tuesday-Thursday (37 mph) and perhaps lighter still on Friday (45 mph). However, the same stretch of freeway may be free flowing (e.g., 65 mph) at noon, flowing well during the evening commute (e.g., 60 mph), and racing along at 75+ mph overnight and on the weekend.

Further, observations for a single person traveling at the roughly the same time over the same route for five days a week, 50 weeks a year, can be accumulated to develop a robust model of the traffic congestion that this person faces each day, including its consistency, its day-of-the-week and season-of-the-year variability, and perhaps most importantly, the congestion's effect on the travel time that the person experiences daily.

Furthermore, these observations can yield information about how the congestion tends to affect certain portions of the route. For example, a portion of a route following "Hwy 1" tends to flow at 39 mph, and the portion that follows "Hwy 2" tends to flow at 51 mph. In turn, the portion of Hwy 1 between $7^{th}$ and $10^{th}$ streets can be observed to average 34 mph at around 7:44 AM, and the portion between $10^{th}$ and $14^{th}$ streets observed to average 41 mph at 7:51 AM and so on.

This description of a single person's experience can be generalized into the system concept of collecting traffic data using "traffic probe" and using that data for traffic modeling. By collecting observations or data for a large enough number of vehicles/drivers (by, for example, using wireless devices with GPS), then those observations and that data can be aggregated and collectively analyzed to develop an overall model of traffic congestion. In such a system, each device (e.g., owned by a driver of a vehicle) serves as a probe sensing the traffic conditions at particular locations and times. The overall picture serves as the traffic model, and is a byproduct of the system.

(a) Interval Based Analysis: One Approach to Traffic and Congestion Modelling Includes Dividing Routes into Intervals and Collecting Data on those Intervals.

To perform such traffic modeling and aggregation of probe data, a framework that sub-divides the highly trafficked parts of the road network into well defined "traffic segments" (e.g., Hwy 1 between $7^{th}$ and $10^{th}$) is provided. Each traffic segment can correspond to a short "chain" of edges that are in the map database. Time also can be sub-divided into intervals (e.g., 15 minute uniform slots).

For traffic and congesting modeling using a road interval-based system, each probe can travel through the network (matching the travel shape of its path to the shape of a continuous sequence of edges) and can provide its average speed through each traffic segment. Such information can be assigned to a best-fitting time bucket.

Even with a well-distributed and robust number of probes, some road segments may not be well traveled at certain times of the day (for instance, reverse commute directions); it may also be that some time periods of the day may not have see very many probes anywhere (2:00-3:00 AM). However, these "gaps" in the data collection represent locations and times when there is not much traffic to begin with (in that the absence of probes in an otherwise well-distributed probe set leads to that conclusion); therefore, such data gaps are not considered to represent a true lack of knowledge concerning traffic conditions on those road segments or at those times. Rather, such absence can itself be considered an indication of where and when traffic congestion likely will not occur, and using default static speed would suffice.

(b) Historical Model: Traffic and Congestion Modeling can be Based Wholly or in Part on Collection of Data and Analysis of Data. A Historical Model can be Used to Refine Static Speeds Assigned Based on Speed Limits and Other Sources, such as from In-Road Sensors.

One product of such a data collection and aggregation process is a "historical traffic model". In one example, a historical traffic model includes a list of traffic segments and associated time-of-day, day-of-week (and given enough time, week-of-year) time slots that contain expected traffic flow speeds (potentially with error estimates) during that time slot on that segment. Gaps can be filled with default "static" speeds. The model can be constructed as a large matrix, with rows representing traffic segments and columns representing time slots.

In some embodiments, it may be that only 20-25% of the edges in the map database will be "covered" by the model, because most edges are minor roads that may have little or no congestion or traffic patterns of interest, and therefore may not be of primary concern. Instead, freeways, highways, and important arteries and connecting ramps would be the primary focus of the traffic model.

One useful application of a historical model is to improve the accuracy of travel time estimation, and in one specific application, Estimation Time of Arrival (ETA) calculations or determination. ETA is an important feature provided by a vehicle navigation system. ETA is a fairly simple concept: "if I leave now and follow this route, about when will I get there?" Determining ETA is equally simple on the surface: if I know my route, and I have an estimate of how long it will take to travel the route (for example, the "static" summation described above), then I can estimate my ETA by taking the current time (or in general, the expected departure time) and merely add the travel time estimate. This technique is good as long as the travel time estimate is reliable.

However, travel time estimates can be unreliable. In fact, there are a variety of factors that can cause travel time to vary. Very long routes probably involve one or more stops (for fuel, food, sleep, etc.) that will increase travel time. Travel time is also (obviously) dependent on actual travel speed: some people drive fast, some drive slow; some times there is bad weather or unforeseen detours; sometimes there is traffic congestion that is slow, slower or even stopped all together. Accurately computing ETA in an automated vehicle navigation system is therefore problematic. Many of the influencing factors are completely beyond the insight or control of the best automated system, as they rely on human behavior (e.g., the decision to make a stop) or the unpredictable future (traffic "accidents" happen). However, if we factor out the uncontrollable, there are still many refinements that may be made to improve travel time estimation accuracy.

Historical modeling techniques also can be personalized for each user, such that particular user habits and preferences can shape data collected and how that data is used in developing a traffic model for that user.

(c) Personalization of Travel Time Estimates.

One improvement in estimation of travel times would be to tailor travel time estimates to individual driving habits and preferences. Such an approach can be explained by reference to a common scenario: the daily commute to and from work. The daily commute has many opportunities for improving travel time estimation accuracy. Much of this revolves around its predictability. The route (or handful of route choices) is usually well established. It probably does not include any stops. It is habitual. Therefore, the habits of the individual driver are easily recognized. For instance, if the "static" travel time for a habitual route is always faster or slower than the time that it takes the person to actually drive the route, then an adjustment factor can be calculated to improve the estimate for that person. Other approaches to using data pertinent to a particular individual or feedback from prior experience to improve system behaviour can be provided. For example, observing how a person drives on different types of roads may pick up similar habits: some people tend to drive fast on the freeway, some drive more slowly. This can similarly be applied to the estimate by applying personalized factors to adjust the speeds used for the different road types. If a person's habits are consistent, then these adjustment factors can be applied to any travel time estimate that is produced for that person, and not just for particular roads or road segments.

(d) Real Time Traffic Data.

Previously, it was disclosed that data collection for and observations about personal driving habits can be used to improve accuracy of the estimation of route travel time and correspondingly ETA determination, and further that historical traffic models have the potential for even greater improvement and wider application.

However, both of these methods rely on the stability of previously observed driving patterns, and some times actual traffic congestion (due to accidents, bad weather, sporting events and similar, or just wide variability) is much worse (and occasionally much better) than expected.

If the departure time for a trip is immediate, it typically is preferable to know what the "live, real time" traffic conditions are now, rather than relying solely on the historical model, at least for the first portion of the route. Such an approach should yield more accurate travel time and ETA, and can serve as a trigger to alert the driver that today's experience will be worse ("you're going to be late") or better ("you have ten extra minutes") than usual.

With a network of probes (which can be used to produce the historical traffic model described previously), it is possible to monitor the current activity of all probes in real time to produce a current picture of traffic congestion, as will be addressed further below. For example for all traffic segments, a list of recent probe samples for each segment can be tracked and used to compute a "live expected speed" for the segment.

An approach to using these live speeds to compute travel time can be similar to the use of speeds from the historical model and can include stepping through the route's edges in sequence computing travel times for each edge. If the edge corresponds to a traffic segment for which there is a current live speed then that speed can be used. If this is no live speed, then the historical model value from the appropriate time slot can be used. If there is no traffic segment, then a static speed can be used.

In practice, a robust implementation is more complicated than this conceptual description. One reason is that live traffic has a limited "shelf life". In other words, after some amount of time (e.g., 30 minutes), it is likely that the current live speed will be invalid, and that the historical pattern speed may be more accurate.

A preferred speed determination function includes a continuous function of live and historical values. A simplified description of one such function can be: for a set time along the route (<10 minutes?) the average live speed of recent probes is used, then for some period of time (10-30 minutes?) a decreasing fraction of live combined with an increasing fraction of historical speed is used, after which historical is used exclusively.

Because conditions will change, the ETA calculation preferably is continuously updated as the route is consumed (traveled) during driving. Such preference is based on at least three reasons. First, actual traffic congestion will continue to evolve, and probes driving somewhere up ahead may detect different and new conditions, thus evolving the live model. Second, because part of the route has been consumed by driving, the location framework for live traffic has shifted, so that live information is needed for roads that are further along the route than originally needed. Third, because actual travel progress may vary greatly from the original estimate (particularly on long routes), the time framework of the historical model may also change, resulting in a dramatic increase or decrease of likely traffic speeds far ahead.

Live traffic and congestion data, such as that obtained from in-vehicle probes, can be used for modelling traffic and congestion, and can supplement a historical model. A mixture of live data and historical data can be used.

(i) Interval-Based Reporting.

It was described above that some examples include probes provided in moving vehicles that report an average speed value over an interval of road (can be described as an average speed value, as time and distance information, as time information, if distance is known, as a difference from an expected average speed value, or equivalent forms of expression that allow determination of an average speed value on a particular interval.

Such interval-based reporting provides benefits that are not available from point based reporting. Point based reporting is where a probe or device indicates an instantaneous speed value at a given time and/or position. Point-based reporting generally consumes more device power, bandwidth, and loads a receiving server more than interval-based reporting. Interval-based reporting can be done based on defined road segments.

For example, a number of roads each can be divided into a number of segments. The divisions of a road into segments can be recorded by defining lat/lon positions for a start and an end of each segment. A lat/lon defining an end of one segment can be used as the lat/lon for the next segment on that road. Other definitional approaches can include providing a lat/lon for a start of a segment and a distance offset. As would be understood by a person of ordinary skill, a variety of approaches to defining road segments can be provided, so long as a given mobile device can determine starting and ending conditions for road segments that it is traversing.

Each of the road segments can be provided with an identifier. The identifiers of the road segments can be made available to the mobile devices (e.g., mobile device 100). In some examples, the mobile device 100 can store all road segment definition data and the identifiers for those defined road segments. Such data also can be stored on the server, or otherwise accessible to the server, such that sharing of segment identifiers provides a way for the mobile devices and the servers to identify particular road segments.

In interval-based reporting, progress reports are based on intervals, rather than on sampling of instantaneous speed at different points along a route. For example, reports can include average speed for a device on a completed interval. However, for interval-based reporting, if a probe vehicle gets stuck in traffic before finishing a given interval, an arbitrarily or unknown delay may occur for the probe to finish the interval and report. Thus, an interval reporting system could fail to report existence of heavy traffic in conditions when such reporting may be most useful. Also, where there is a specific, potentially serious traffic condition, it can be useful to have a more granular perspective as to where that problem is within a given road segment.

Additional logic can be provided in each probe, which monitors progress in completing each interval. If the probe is not making sufficient progress (average speed is less than 15 mph, for example), the logic ends the interval early and reports an average speed immediately.

In an example where the intervals are defined using fixed road segments, such logic can use a "partial" segment defined as a segment plus an offset distance (e.g., a number of meters) from the beginning of the segment. After the first partial segment report, the probe can continue to make partial reports until the segment is complete. A server receiving this report information can treat each partial report as an estimate of the speed on the entire segment, extrapolating the speed to the entire length of the segment.

For each subsequent partial report, the server can update the average speed of the segment, until eventually the server can provide a complete report for that segment. If multiple probes are on the same segment and sending partial reports, the server can update each partial report from each probe using a trip identifier. The server may ultimately save only the final, completed segment report to a historical database, in situations where the true average speed on that segment is the principal figure used for providing estimates, such as ETA and ETD. These partial reports also can be used to build a sub-segment resolution representation of traffic on the segment, pinpointing where traffic conditions are worst along the segment. In some examples, these partial reports can be used in determining where to subdivide (or further subdivide) a road into segments.

(ii) Critical Mass for Real-Time Traffic Data.

A limited shelf life of traffic data also implies that the availability of live traffic data for a probe-based system depends on the existence of traffic probes. Further, such probes would best be available during potential times of congestion on routes where such congestion likely would occur. As such, a probe-based live traffic model benefits from the presence of a "critical mass" of probes driving around the corresponding road network. There are many possible ways to define critical mass. One useful definition is that, for each important traffic segment, there has been at least one probe sample collected within the last 5 minutes. In a gradual probe deployment (for instance, based on the gradual adoption of a consumer application), it is likely that the most highly trafficked roadways will achieve critical mass first, followed less highly trafficked roadway, and so on. It is also likely that some directions of some roads, and certain times of the day (or night) may not readily achieve a critical mass of live traffic probes. However, because there is a high correlation between presence of probes at locations and at times where and when there is a need for probe data, a "working" critical mass can be achieved with tractable probe penetration numbers.

A definition of critical mass can be adapted for particular users. For example, a route taken to work by a particular user may achieve critical mass on a given day, if each (potentially congested) traffic segment had at least one valid probe sample available before that user drove such segment. Thus, in a given deployment, some people will enjoy the benefits of critical mass in advance of general availability. A probe-based system also causes some probes to be "sacrificial probes" in that those problems did not get a live traffic data, and instead were caught in a given traffic problem. In other words, for some users to avoid traffic, some other user has to encounter it.

It is possible to extend the benefits of the live traffic model to other applications. For example, an application can be provided that estimates a required departure time, to arrive at a given destination at or before a given time. More particularly, the application can give updates as to changes in required departure time based on the live traffic model. For example, if a person knows of (or have calendared) a 10:30 appointment, a device, such as a digital assistant or phone, can repeatedly check an ETA, and provide an alert when the ETA is within a range of the appointment time (e.g., 5, 10, 15, or 20 minutes). If the person has experience traveling that route, then such an application can help the user leave at an appropriate time based on live traffic conditions, rather than simply on personal experience. The ability to personalize the ETA is application in this application as well. Further user selectable capabilities can be provided, including selecting when alerts are provided. Still further, on longer trips, the application can provide an alert sooner. The person also can calendar the urgency or importance of the meeting and the application can respond to that importance or urgency level in tailoring when alerts should be given.

IV. Applications.

(a) Estimation of Travel Time with a Historical Traffic Model.

Estimating travel time using a historical traffic model can be performed by stepping through each of the edges in the route's sequence, determining the travel time for each edge, and summing the total. For edges that correspond to segments in the traffic model, a speed value selected from the historical traffic model can be used rather than the "static" speed from the map database.

Under an assumption that the edge to traffic segment (matrix row) conversion is straight-forward, the remaining part is selecting the appropriate time slot (matrix column). However, if an expected departure time is known, then the appropriate slot may be determined by adding the total time accumulated prior to visiting the current edge to the expected departure time to determine an estimated time of arrival at that edge. Thus we have identified the time slot to choose (the containing one, or the next if we are too near to the end of the time interval). The travel time accumulation should be performed in sequential order, and repeated if the departure time changes appreciably.

(b) Estimating Travel Time with Live Traffic Information.

As explained above, live traffic information can be obtained or otherwise gathered, such as from mobile devices functioning as probes for gathering such information. The probes can send reports about the traffic conditions that they experience to a server, which processes those reports and sends information to be received by the mobile devices. The live traffic information can be used in formulating travel time estimates and for routing. The live traffic information can be used in conjunction with historical traffic data. For example, live traffic data can be emphasized for a portion of a route closer to the current location of a device to which the travel time estimate pertains, while usage of historic traffic conditions for portions of the route further from the device can predominate.

(c) Estimating Required Time of Departure.

In addition to giving ETA estimates, understanding travel times a second application that relates to ETA. This application can be phrased as "What is my Required Time of Departure (a.k.a ETD) ?" In other words, if I know that I need to get somewhere at time T, when do I need to leave in order to be confident that I will make it? An example method to determine includes: perform a "static" travel time summation at ($tt_{static}$); assume the departure time is $T-tt_{static}$ and calculate the $ETA_1$; if $ETA_1>T$, then back up the departure time by the difference ($ETA_1-T$) and try again. Repeat until $ETA_i<=T$. Error factors may be used "pad" the travel time estimation in order to reduce the chance of being late in case the traffic happens to a little worse (but not unusually worse) than usual.

(d) User Interfaces for Sending Notifications of ETA Via Messaging Technologies.

Figure 15:
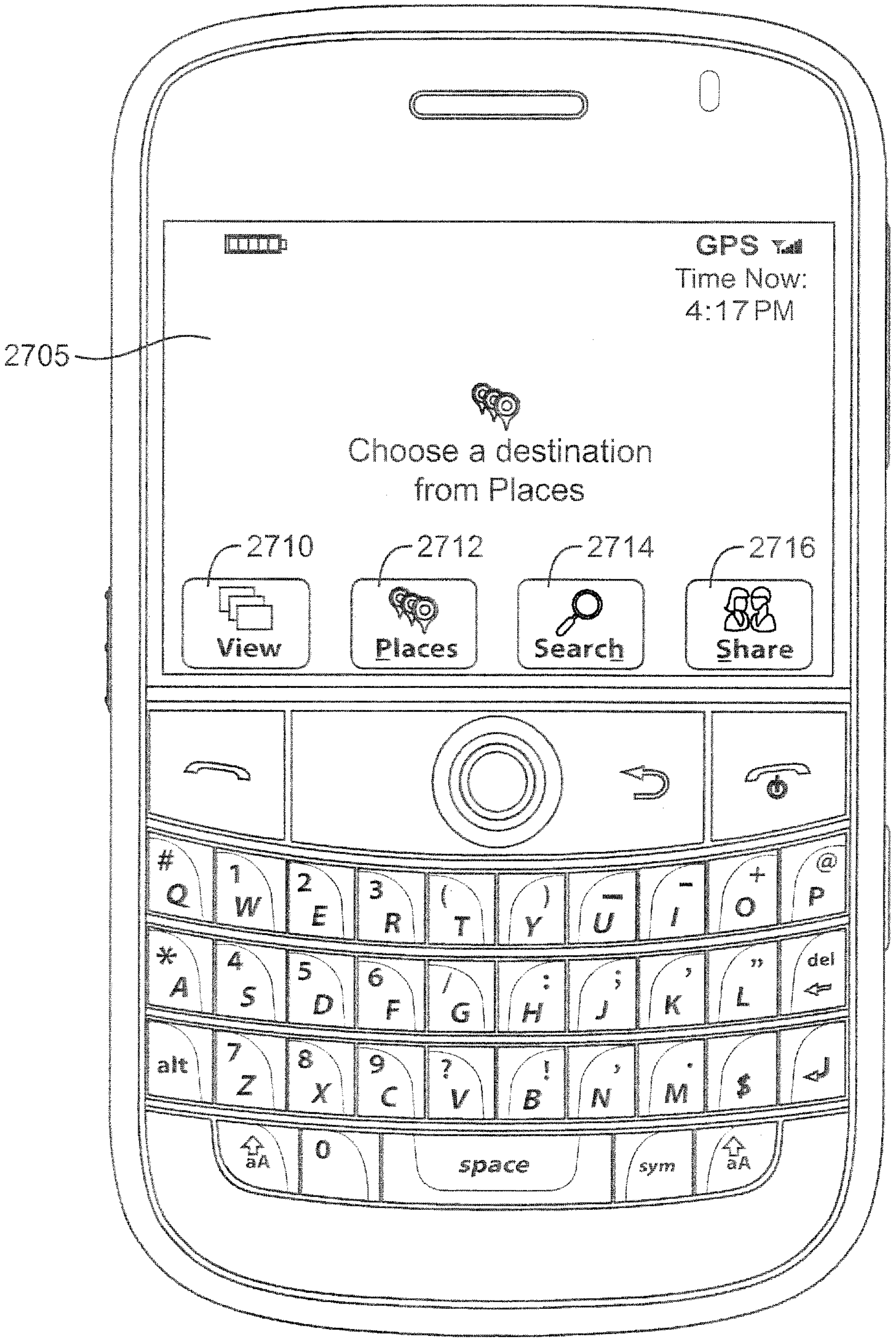
FIG. 15 depicts an example start screen of a navigation function that can provide functionality and use technology described above.
Figure 16:
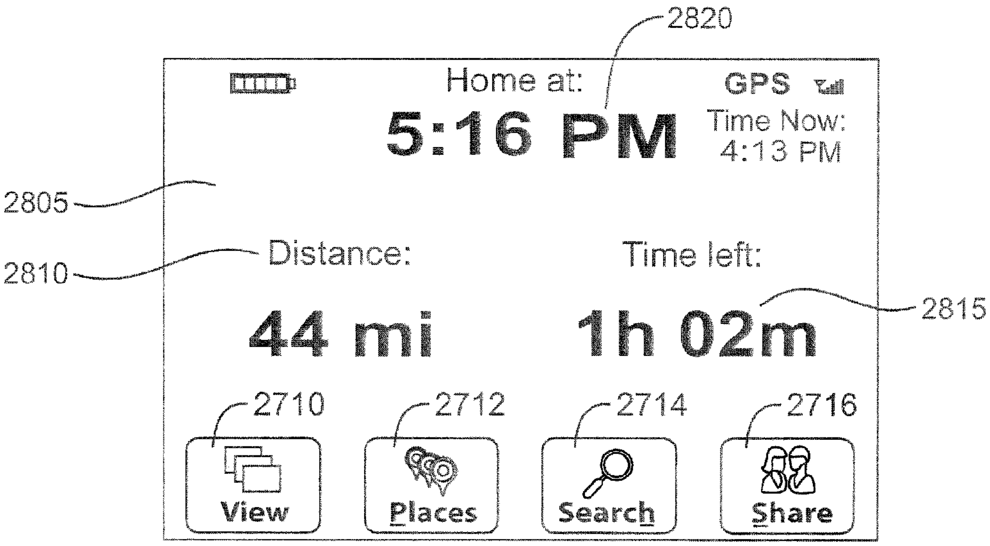
FIG. 16 depicts an example display of ETA information.

FIG. 16 depicts an example user interface screen that can be displayed when a navigation application is selected or activated. FIG. 15 depicts a user interface element 2705 prior to obtaining a positional fix. In this pre-location determination period, the depicted user interface element 2705 can accept inputs that can include selection of a view 2710, a places 2712, a search 2714, and a share 2716 element.

User interface element 2705 can suggest to choose a destination by selection of places 2712. As depicted, in FIG. 16, user interface element 2805 can show a miles remaining 2810, a time remaining 2815 and an absolute estimated time of arrival 2820, in addition to the same selectable elements, view 2710, places 2712, search 2714, and share 2716 element, as depicted in FIG. 16.

In addition to providing an ETA to a user of a device, such as through a display of the device, example devices and methods can provide a user-friendly mechanism for sharing such an ETA. In one preferred approach, locations are associated with one or more users, or contact information for one or more users. For example, a work location can be associated with an administrative contact, while a home location can be associated with a spouse. Each person can have an entry in a contact database, which includes one or more ways in which that person can be contacted, such as a telephone number, an e-mail address, and so on. Upon a selection of a given location as a destination for an estimation of an arrival time, any contact associated with that destination can be sent automatically an estimate of the arrival time. For example, an instant message can be sent to a telephone number of an administrative assistant contact associated with a work destination.

V. Example Architectures

To aid the reader in understanding at least one environment in which the notification sub-system 80, and the above-described applications, may be implemented, an example system comprising the wireless network 200 and other components that may be used to effect communications between mobile devices 100 and the notification sub-system 80 will now be described.

As noted above, data communication devices will be commonly referred to as "mobile devices". Examples of applicable mobile devices include pagers, cellular phones, cellular smart-phones, portable gaming and entertainment devices, wireless organizers, personal digital assistants, computers, laptops, handheld wireless communication devices, wirelessly enabled notebook computers and the like.

One exemplary mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a smartphone, a data messaging device, a two-way pager, a cellular telephone with data messaging capabilities, a wireless Internet appliance, or a data communication device (with or without telephony capabilities).

The mobile device may be one that is used in a system that is configured for continuously routing content, such as pushed content, from a host system to the mobile device. An example, architecture of such a system will now be described.

(a) Example System Architecture.

Figure 2:
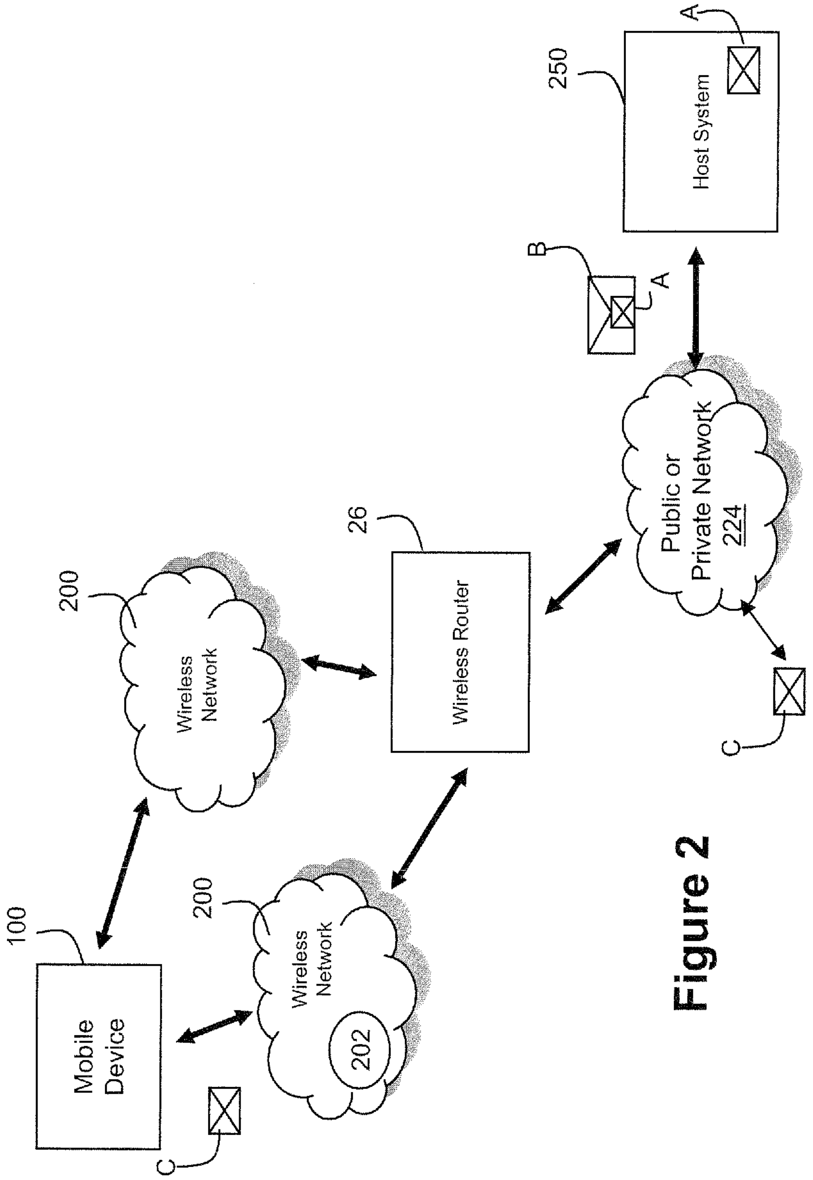
FIG. 2 depicts a system diagram illustrating the environment in which data items are pushed from a host system to a mobile device.

Referring now to FIG. 2, an example system diagram showing the redirection of user data items (such as message A or C) from a corporate enterprise computer system (host system) 250 to the user's mobile device 100 via a wireless router 26 is provided. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 2 represents an internal message sent from, e.g. a desktop computer within the host system 250, to any number of server computers in the corporate network 260 (e.g. LAN), which may, in general, include a database server, a calendar server, an E-mail server or a voice-mail server.

Message C in FIG. 2 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores (for example a data store for e-mail can be an off-the-shelf mail server program such as Microsoft Exchange® Server or Lotus Notes® Server), which typically are behind a corporate firewall.

The mobile device 100 may be adapted for communication within wireless network 200 via wireless links, as required by each wireless network 200 being used. As an illustrative example of the operation for a wireless router 26 shown in FIG. 2, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

(i) Message Router/Relay Server.

Provision of a wireless router 26 (sometimes referred to as a "relay"), there are a number of advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 5) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a handheld two-way wireless paging computer as exemplified in FIGS. 3-8, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection, e.g. a portable gaming device. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others.

This wireless network 200 abstraction can be accomplished by wireless router 26, which can implement this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

Providing push services for host systems 250 can be bettered by the wireless router 26 implementing a set of defined functions. The wireless router 26 can be realized by many hardware configurations; however, features described likely would be present in these different realizations.

Figure 4:
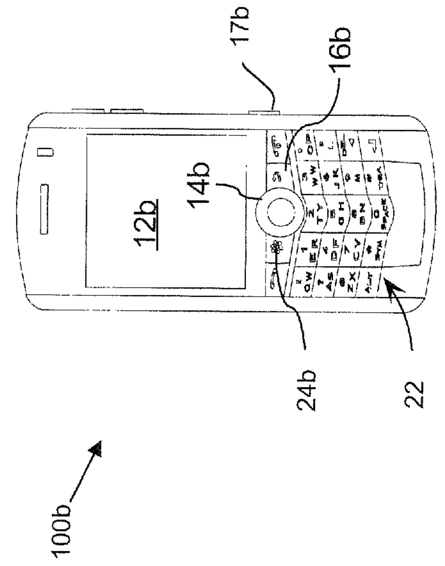
FIG. 4 depicts a schematic diagram of another mobile device and a display screen therefor.
Figure 3:
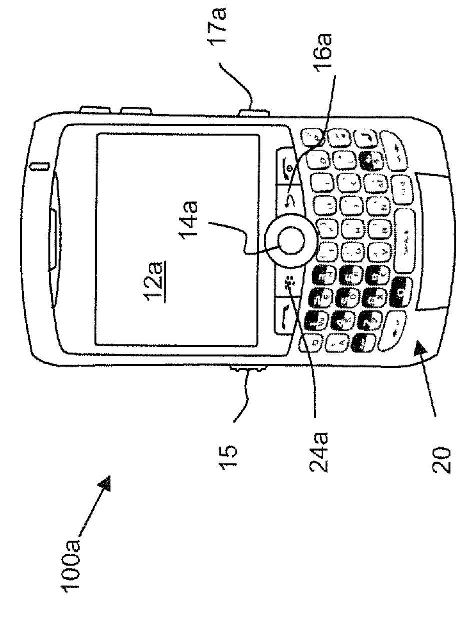
FIG. 3 depicts a schematic diagram of a mobile device and a display screen therefor.

Referring to FIGS. 3 and 4, one example of a mobile device 100*a* is shown in FIG. 3, and another example of a mobile device 100*b* is shown in FIG. 4. More generally, the numeral "100" will hereinafter refer to any mobile device 100, and by explanation and reference, the examples 100*a* and 100*b* of FIGS. 3 and 4. A similar numbering convention is used for some other general features common between FIGS. 3 and 4 such as a display 12, a positioning device 14, a cancel or escape button 16, a camera button 17, and a menu or option button 24.

The mobile device 100*a* shown in FIG. 3 comprises a display 12*a* and the cursor or view positioning device 14 shown in this embodiment is a trackball 14*a*. Positioning device 14 may serve as another input member and is both rotational to provide selection inputs to the main processor 102 (see FIG. 5) and can also be pressed in a direction generally toward housing to provide another selection input to the processor 102. Trackball 14*a* permits multi-directional positioning of the selection cursor 18 (see FIG. 7) such that the selection cursor 18 can be moved in an upward direction, in a downward direction and, if desired and/or permitted, in any diagonal direction. The trackball 14*a* is in this example situated on the front face of a housing for mobile device 100*a* as shown in FIG. 3 to enable a user to manoeuvre the trackball 14*a* while holding the mobile device 100*a* in one hand. The trackball 14*a* may serve as another input member (in addition to a directional or positioning member) to provide selection inputs to the processor 102 and can preferably be pressed in a direction towards the housing of the mobile device 100*b* to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100*a* in FIG. 3 also comprises a programmable convenience button 15 to activate a selected application such as, for example, a calendar or calculator. Further, mobile device 100*a* includes an escape or cancel button 16*a*, a camera button 17*a*, a menu or option button 24*a* and a keyboard 20. The camera button 17 is able to activate photo-capturing functions when pressed preferably in the direction towards the housing. The menu or option button 24 loads a menu or list of options on display 12*a* when pressed. In this example, the escape or cancel button 16*a*, the menu option button 24*a*, and keyboard 20 are disposed on the front face of the mobile device housing, while the convenience button 15 and camera button 17*a* are disposed at the side of the housing. This button placement enables a user to operate these buttons while holding the mobile device 100 in one hand. The keyboard 20 is, in this embodiment, a standard QWERTY keyboard.

The mobile device 100*b* shown in FIG. 4 comprises a display 12*b* and the positioning device 14 in this embodiment is a trackball 14*b*. The mobile device 100*b* also comprises a menu or option button 24*b*, a cancel or escape button 16*b*, and a camera button 17*b*. The mobile device 100*b* as illustrated in FIG. 4, comprises a reduced QWERTY keyboard 22. In this embodiment, the keyboard 22, positioning device 14*b*, escape button 16*b* and menu button 24*b* are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

The mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other input device, whether presently known or unknown, may be employed. Similarly, any variation of keyboard 20, 22 may be used. It will also be appreciated that the mobile devices 100 shown in FIGS. 3 and 4 are for illustrative purposes only and various other mobile devices 100 are equally applicable to the following examples. For example, other mobile devices 100 may include the trackball 14*b*, escape button 16*b* and menu or option button 24 similar to that shown in FIG. 4 only with a full or standard keyboard of any type. Other buttons may also be disposed on the mobile device housing such as colour coded “Answer” and “Ignore” buttons to be used in telephonic communications. In another example, the display 12 may itself be touch sensitive thus itself providing an input mechanism in addition to display capabilities. Furthermore, the housing for the mobile device 100 should not be limited to the single-piece configurations shown in FIGS. 3 and 4, other configurations such as clamshell or “flip-phone” configurations are also applicable.

Now, to aid the reader in understanding the structure of the mobile device 100 and how it can communicate with the wireless network 200, reference will now be made to FIGS. 5 through 8.

(ii) Example Mobile Device Architecture.

Figure 5:
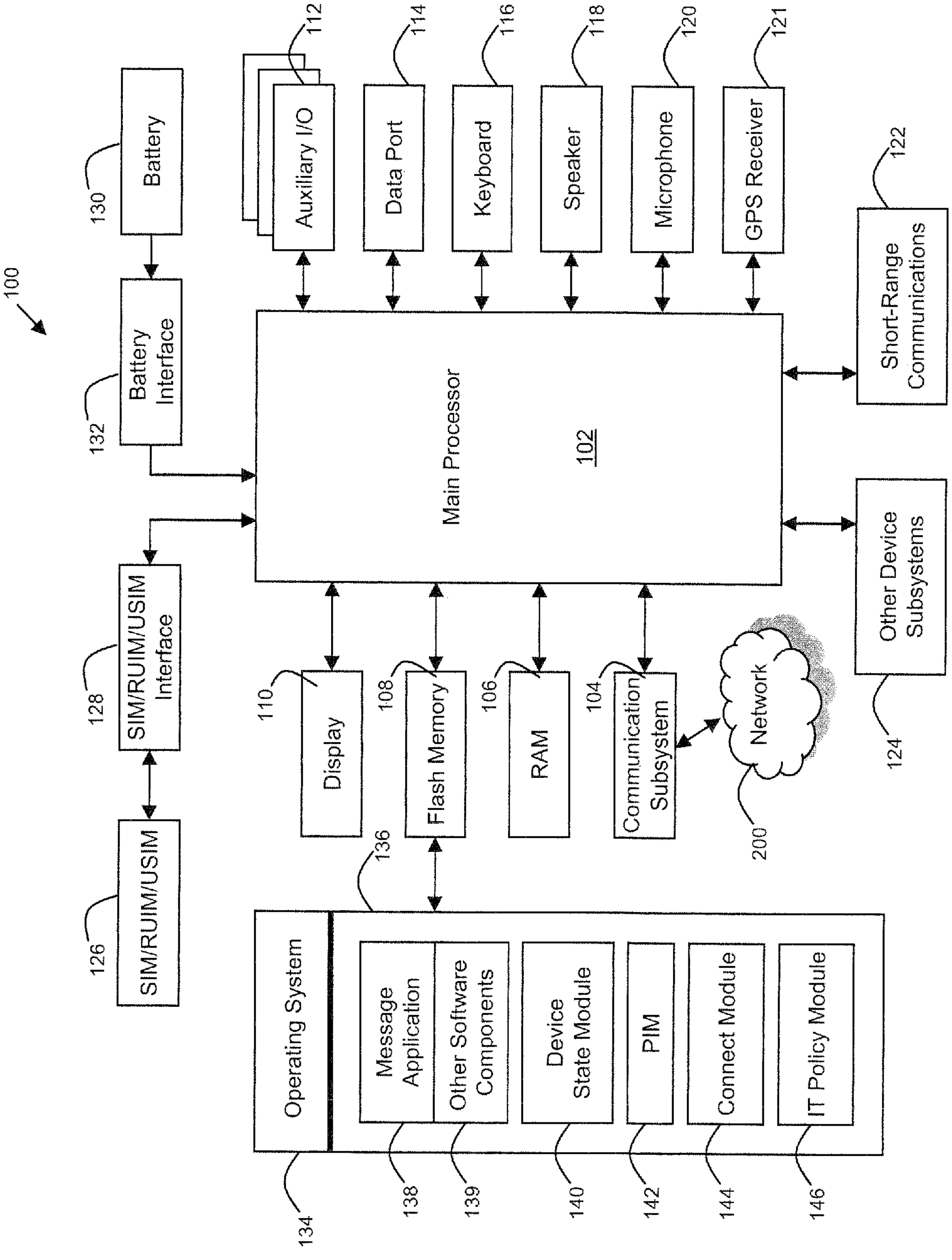
FIG. 5 depicts a block diagram of an exemplary embodiment of a mobile device.

Referring first to FIG. 5, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the aspects disclosed herein can be used with and adapted for other suitable communication protocols and standards that may be developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide “resident” or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or “smart card” 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100. In some embodiments, a plurality of batteries, such as a primary and a secondary batter may be provided The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

(A) Mobile Device Software & Firmware.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 can provide persistence, i.e. the device state module 140 provides for availability and storage of potentially important device data. Device state module 140 can be implemented using flash memory 108 (or other non-volatile memory technologies), so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 can receive IT policy data that encodes IT policies, and may be responsible for organizing and securing rules, such as a "Set Maximum Password Attempts" IT policy, and password expiration policies.

Other types of software applications or components 139 can also be installed on the mobile device 100. These software applications 139 can be pre-installed applications (e.g., applications other than message application 138) or third party applications, which are added after the manufacture of the mobile device 100. Examples of third party applications include games, calculators, and utilities.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

(B) Wireless Communication Sub-System.

Figure 6:
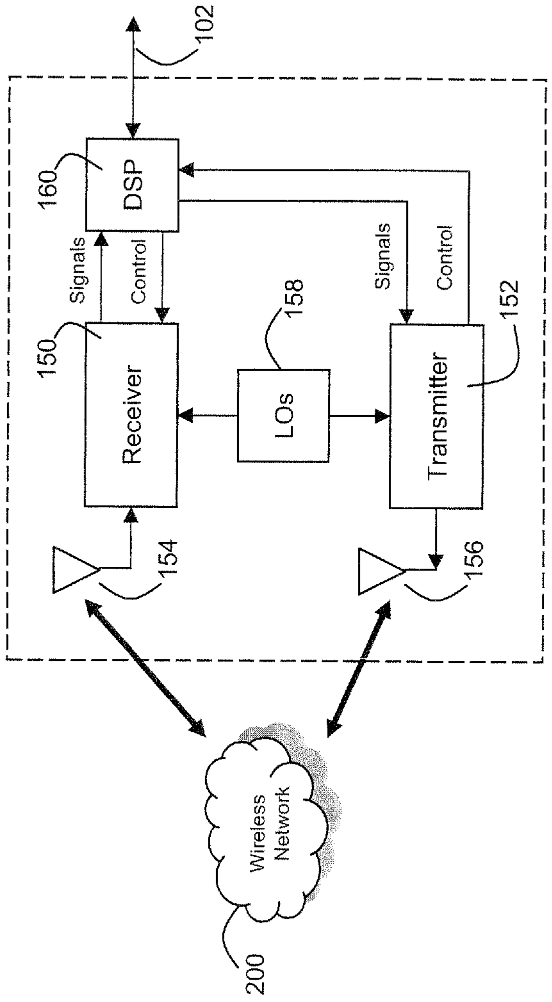
FIG. 6 depicts a block diagram of an exemplary embodiment of a communication subsystem component of the mobile device of FIG. 5.

Referring now to FIG. 6, an exemplary block diagram of the communication subsystem component 104 is shown. The communication subsystem 104 includes a receiver 150, a transmitter 152, and example associated components such as one or more embedded or internal antenna elements 154 and 156, Local Oscillators (LOs) 158, and a processing module such as a Digital Signal Processor (DSP) 160. The particular design of the communication subsystem 104 can be dependent on the communication network 200 with which the mobile device 100 is intended to operate. Thus, it should be understood that the design illustrated in FIG. 6 serves only as one example. Radios also can be implemented differently, for example, LOs can be avoided by avoiding intermediate frequencies, such as by using direct digital sampling.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that should be conserved, based on concerns such as limits of overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods. The receiver 150 also can be turned on to poll for data to be retrieved.

Some aspects of the description provided relate to a system architecture where information can be pushed to mobile devices. Such system architectures can operate to push information responsive to a request from a mobile. For example, mobile device 100 can request information periodically, and the system can respond with any messages or notifications determined to be applicable to device 100.

(C) Example User Interface.

Figure 7:
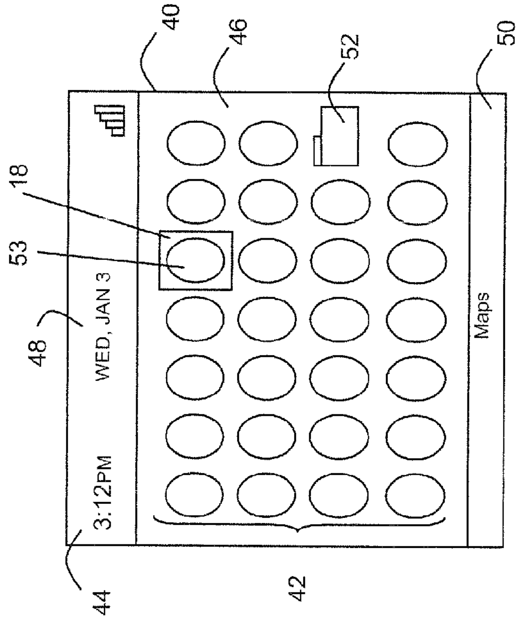
FIG. 7 depicts a screen shot of an exemplary home screen displayed by a mobile device.

Turning now to FIG. 7, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 can provide information to the user based on the location of the selection cursor 18, e.g. by displaying a name for the icon 53 that is currently highlighted.

An application, such as a maps program 60 (see also FIG. 8) may be initiated (opened or viewed) from display 12 by highlighting a corresponding icon 53 using the positioning device 14 and providing a suitable user input to the mobile device 100. For example, maps program 60 may be initiated by moving the positioning device 14 such that the icon 53 is highlighted by the selection box 18 as shown in FIG. 7, and providing a selection input, e.g. by pressing the trackball 14*b*.

Figure 8:
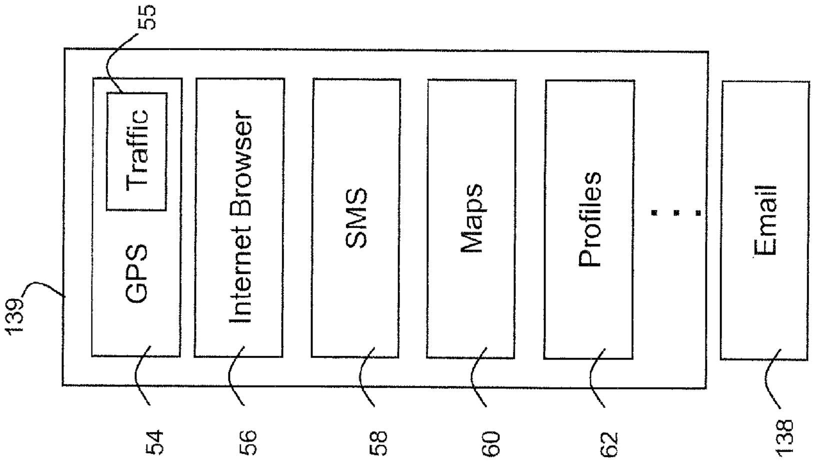
FIG. 8 depicts a block diagram illustrating exemplary ones of the other software applications and components shown in FIG. 5.

FIG. 8 shows an example of how other software applications and components 139 that may be stored on and used with the mobile device 100 can use the user interface. Only examples are shown in FIG. 8 and such examples are not to be considered exhaustive. In this example, a global positioning system (GPS) application 54, internet browser 56, simple message service (SMS) 58, maps program 60 and a profiles application 62 are shown to illustrate the various features that may be provided by the mobile device 100. The GPS application 54, in this example, comprises a traffic module 55, which represents any sub-program, sub-routine, function or other set of computer executable instructions for providing device data 78 to the notification sub-system 80, when such data 78 is obtained using the GPS application 54. Also shown in FIG. 8 is the message application 138, which in the following will be referred to as an email application 138 for clarity. It will be appreciated that the various applications may operate independently or may utilize features of other applications. For example, the GPS application 54 may use the maps program 60 for displaying directions to a user.

(iii) Notification Sub-System.

Figure 9:
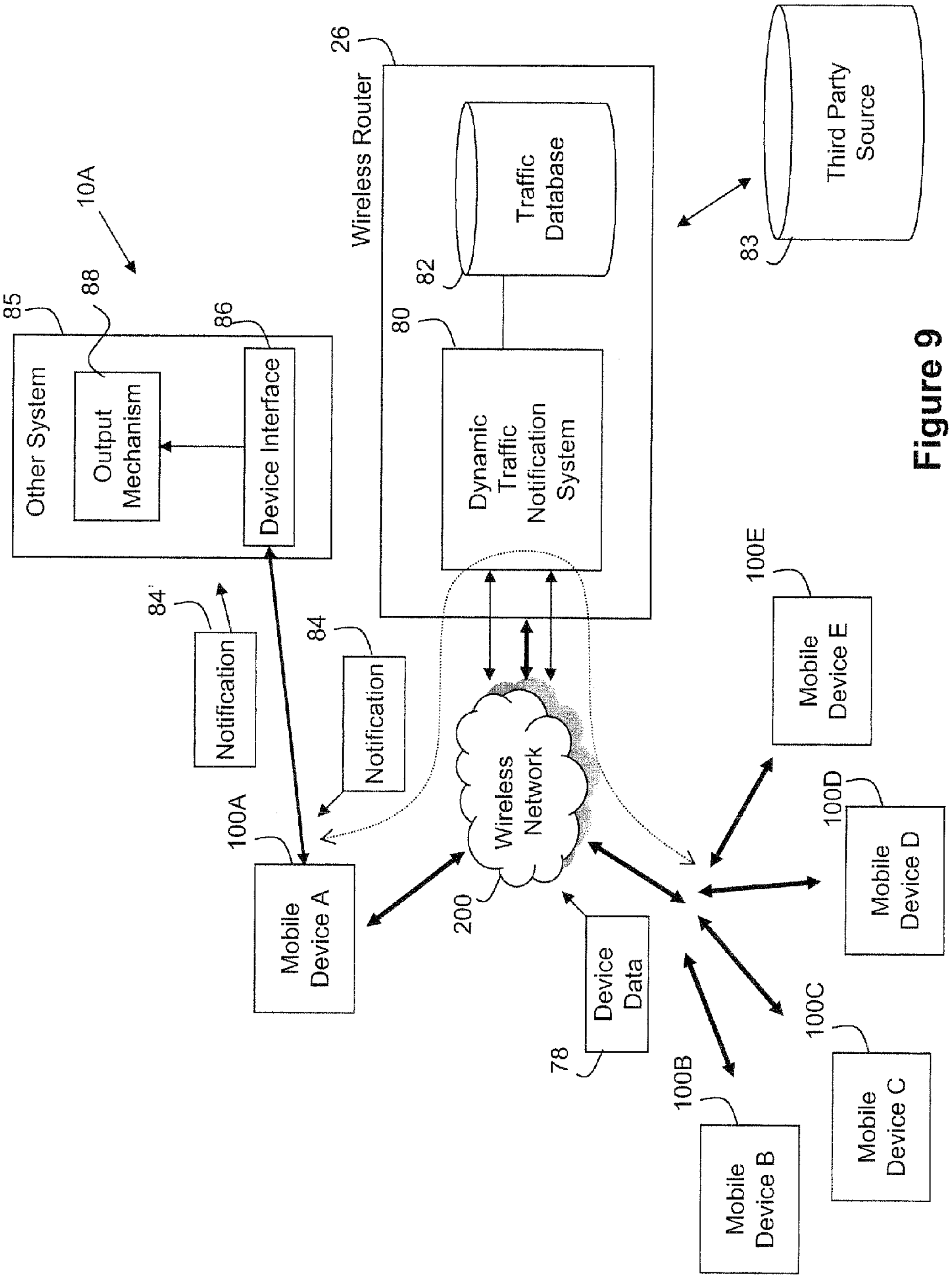
FIG. 9 depicts a schematic diagram showing an example configuration for the embodiment of FIG. 1 when implemented with the wireless router shown in FIG. 2.

Turning now to FIG. 9, an exemplary implementation of the notification sub-system 80 is shown, wherein the notification sub-system 80 is hosted by the wireless router 26 described above. In this example, the wireless router 26 is responsible for routing messages from and to mobile devices 100A-100E and thus has the ability to obtain device data 78 provided by a plurality of such mobile devices 100 in order to prepare notifications 84 for those plurality of mobile devices 100 and other mobile devices. Consistent with FIG. 1, the implementation exemplified in FIG. 9 illustrates obtaining device data 78 from each of mobile devices 100B through 100E and provides a notification 84 to mobile device 100A. It will be appreciated that the device data 78 and notifications 84 may comprise separate and distinct data packages sent using separate protocols or may take advantage of existing communication methods such as email, SMS, etc.

The notification sub-system 80, which in this example can reside at the wireless router 26, stores traffic-related data in a traffic database 82. Such traffic-related data may comprise any device data 78 obtained from various mobile devices 100, copies of notifications 84 that have already been sent (or are about to be sent—to facilitate repeated use of the same notifications 84), and any other information that may be required to carry out the delivery of a notification 84 based on the acquisition of device data 78, several examples of which will be explained below. It will be appreciated that the traffic database 82 may represent any memory, datastore, or storage medium and may or may not be internal to the wireless router 26. For example, the traffic database 82 may be maintained by a third party or configured to be an integral component of the notification sub-system 80. As such, the configuration shown in FIG. 9 is merely for illustrative purposes and variations thereof are equally applicable according to the principles described herein. The notification sub-system 80 may also have access to a third party source 83 to obtain additional data pertaining to traffic events and other location based information. For example, the third party source 83 may represent police or emergency crew dispatchers that provide more detailed information pertaining to accidents. The third party source 83 may also provide information such as the locations of gas stations, tow truck origins, and so on, for use in various embodiments as will be exemplified below. There may be any number of third party sources 83 available to the notification sub-system 80, which can vary according to the particular embodiment.

FIG. 9 also illustrates that, in addition to providing an alert to the user of the mobile device 100A using the notification 84 on the mobile device 100A itself, the notification may be used in other ways. In this example, a copy of the notification 84' is provided to an other system 85 through a device interface 86 such that an alert may be provided to the user through an output mechanism 88. For example, the vehicle 10A is shown as comprising the other system 85, which may represent a vehicle entertainment or navigation system, a vehicle engine control system, as well as various dashboard implemented systems. In this way, the mobile device's access to the information comprised in the notification 84 can be shared with other systems in the same locale as the mobile device 100A in order to provide a wide range of alert types and to coordinate with other sub-systems.

The configuration shown in FIG. 9 can also provide for a mobile device 100 without a GPS receiver 121 to utilize location and speed information acquired by the vehicle 10, for example through a vehicle navigation system, an on-board-diagnostics (OBD) connection or both. As such, the mobile device 100 also can be the communication link between a vehicle 10 and the notification sub-system 80 to accommodate a wider range of environments and configurations. Also, the mobile device 100 may itself be integral to the vehicle 10 (not shown), e.g. where the vehicle has a GPS receiver and wireless connectivity. The principles described herein may be applied to a mobile device 100 in any form, including wherein the mobile device 100 is provided as a sub-system of a vehicle 10.

VI. Faster Detection of Traffic Jams in Interval-Based Reporting.

Figure 10:
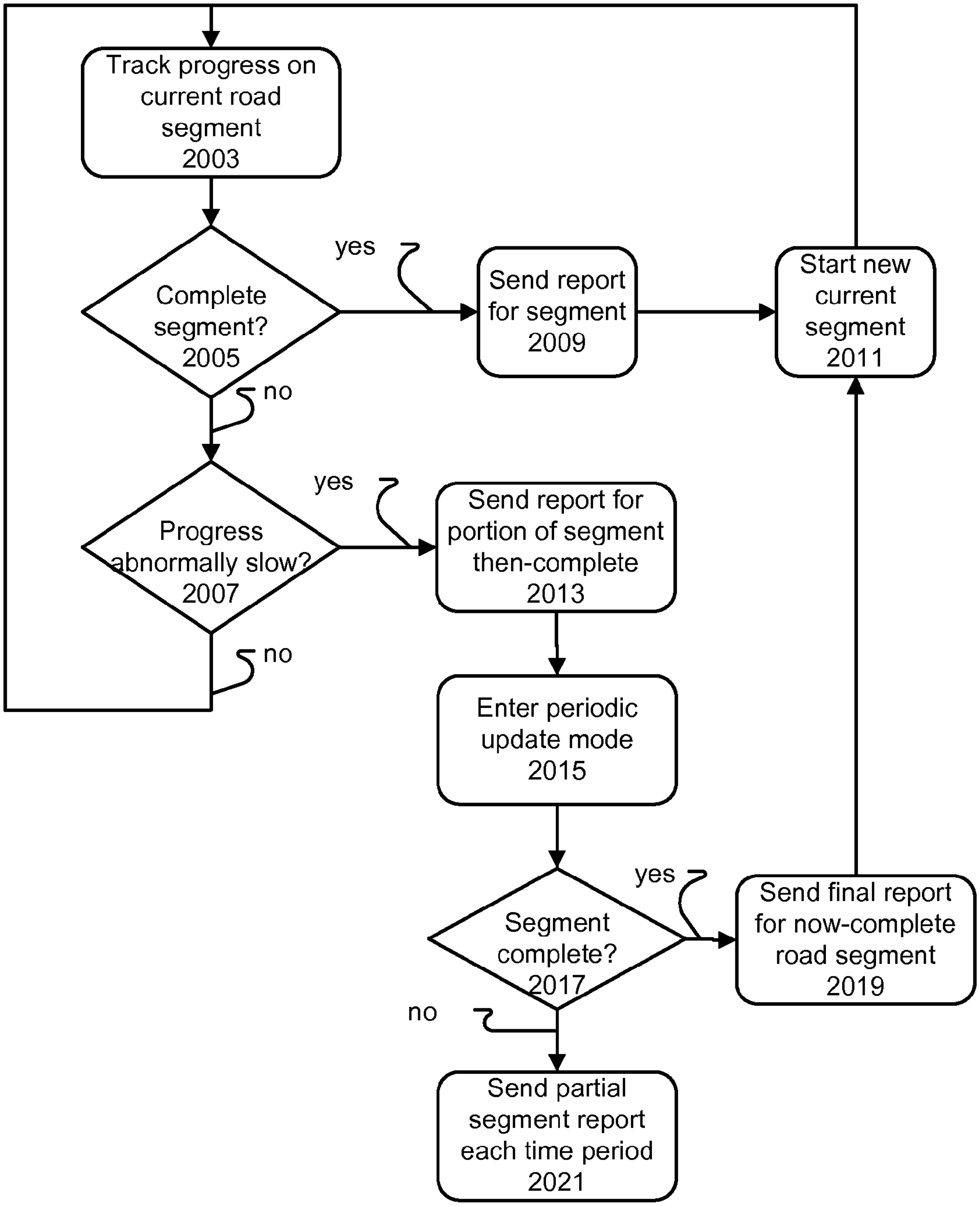
FIG. 10 depicts an example method that can be implemented in mobile devices participating as probes in an interval-based traffic reporting system.
Figure 11:
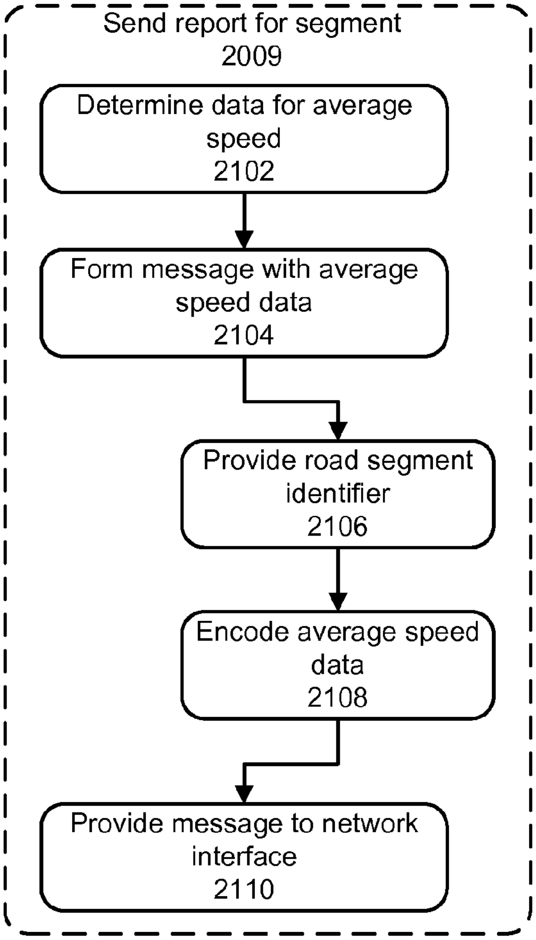
FIGS. 11 and 12 depicts method aspects that can be employed in the method of FIG. 10.

It was explained above that FIG. 10 depicts an example method that can be implemented on a mobile device (such as those described above) and which function as traffic probes in an interval-based traffic reporting system. FIG. 10 depicts that progress on a current road segment is tracked (2003). One aspect of progress tracking can include a determination (2005) of whether the current segment has been completed. If the segment is complete, then a report for that segment can be sent; in one example, the report includes an average speed for the mobile device on that now-completed segment. An example method for preparing such a report is depicted in FIG. 11, and described following.

If the segment is not complete, then a determination (2007) of whether progress has been abnormally slow is made. Such a determination can include comparing an average speed on the portion of the segment completed to an average speed for that segment (or a separately maintained average speed for that segment portion), and if the comparison indicates a slowing of more than a threshold, then an abnormally slow determination can be made. Other example approaches to determining abnormally slow conditions include detecting whether there was a sudden deceleration, which persists for more than a threshold amount of time, an appropriately scaled portion of the average speed, or whether an expected amount of time to complete the segment (or the portion completed) has exceeded a threshold.

Figure 12:
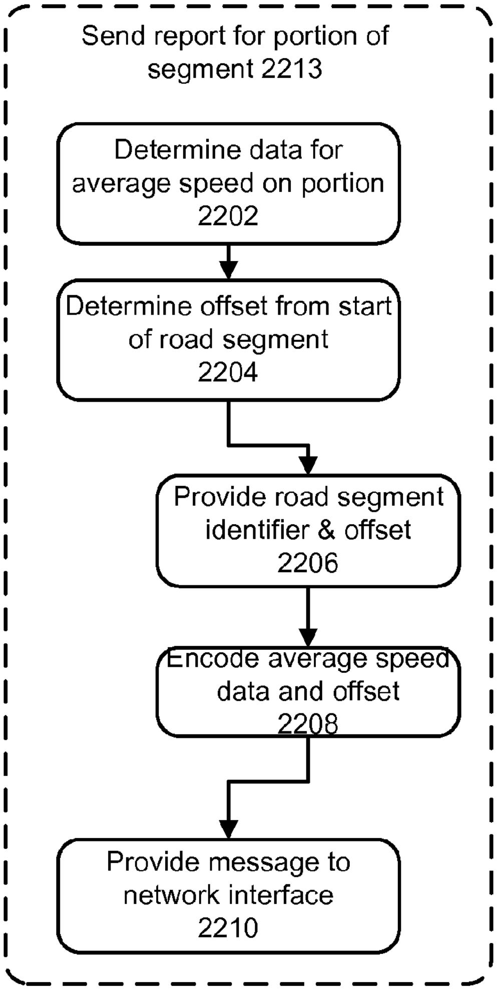

If abnormally slow progress has been determined, then a report for the portion of the segment completed is sent (2013). FIG. 12 depicts an example method for a report concerning a partially-completed road segment.

Continuing with FIG. 10, if an abnormally slow condition was determined (see 2007), then the method can enter a periodic update mode (2015). In periodic update mode, the method continues to check whether the current road segment is complete (2017), and if the segment is complete, then a final report is sent (2019). Such report can be prepared according to the method depicted in FIG. 11.

If the current segment remains incomplete, then another partial segment report is sent (2021), which can be prepared according to the method of FIG. 12. In one example, the segment complete determination (2017) can be made periodically, such as every minute, every 15, 30 seconds, or every 5 minutes. Such time can be selected based on considerations including preserving battery life, as in some implementations, one or more of a radio required to transmit the report, as well as the GPS receiver can be disabled to save power between such determinations.

Upon completion of a road segment, a new segment can begin (2011), and the depicted method can repeat. In this description, some elements were disclosed, for simplicity, as happening sequentially or serially. However, embodiments need not have such temporal ordering. For example, there may be some lag between when a segment is determined completed, such that the mobile device may already be physically present in a new road segment when the report for the last road segment is transmitted.

FIG. 11 depicts an example method of preparing reports for completed road segments (see 2009, FIG. 10). The depicted method includes determining (2102) data for an average speed on the road segment. Such data can include data expressing a numerical average speed quantity, a time to complete the road segment (where a distance of the segment can be known by a receiver of the report, ex ante), or other data from which an average speed can be calculated based on speed, distance and time relationships. However, a series of instantaneous speed and location measurements taken on the road segment is not average speed data. A message is formed (2104) with the average speed data, such forming (2104) preferably comprises providing (2106) an identifier for the completed road segment and encoding (2108) the average speed data. The message is provided (2110) to the network interface. Examples of road segment identifiers include a unique alphanumeric identifier and a lat/lon combination for a start of the road segment.

FIG. 12 depicts an example method of preparing reports for partially completed road segments (see 2013, FIG. 10). FIG. 12 depicts that average speed data on the completed portion can be determined (2202). A road segment identifier (2206) and an offset from a start of the road segment (e.g., a quantification of the portion of the road segment completed) is determined (2204). Such information is encoded (2208) and provided (2210) in a message to the network interface.

Figure 13:
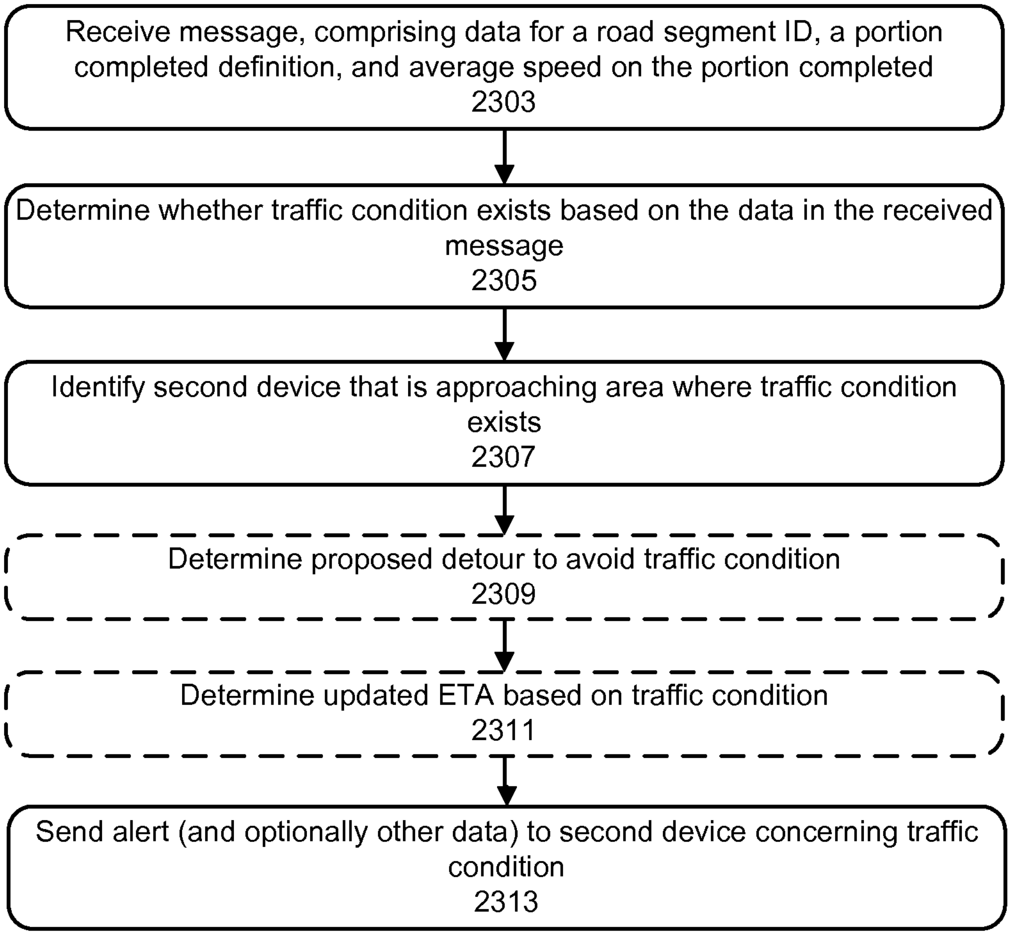
FIG. 13 depicts a method for alerting.

These messages can be received by a server (or group of servers, or other implementation of a centralized receiver of reports) and processed. An example method of such processing is depicted in FIG. 13. FIG. 13 includes receiving a message (2303), which includes data for a road segment identifier, a portion completed definition (for a partially completed road segment), and average speed data, either for an entirety of the road segment, or for the portion completed).

A determination (2305) about whether a traffic condition exists can be determined based on the received messages (reports). For example, a report indicating much slower average transit times for a partially completed road segment than for a report received earlier for the same segment may indicate a changed condition. Historical traffic data also can be accessed to determine whether that road segment portion is prone to congestion on that road segment portion (although typically, an average time for completing that road segment portion, or the entirety of the road segment preferably would be updated to reflect the existence of a regular congestion point).

Upon determining that a traffic condition exists, other devices (a second device) that are approaching the area can be identified (2307). One example approach to detecting whether a second device is approaching the area can be to analyze most recently received reports of devices, as described above, or to track which devices have that road segment on a current route. A detour can be determined (2309) that would allow circumnavigation of the traffic incident. An updated ETA determination (2311) also can be triggered based on a received partial segment report. An alert is sent (2313) to those devices determined to be approaching the traffic congestion; such alert can be accompanied by any proposed detour or updated ETA calculated.

VII. An Example Approach to User Interfaces for Sending Notifications of ETA Via Messaging Technologies The above description is related to automatically predicting a destination for automatic provision of an ETA and related information. The traffic congestion information described with respect to FIGS. 10 and 13 can be used in providing inputs for ETA calculation as described with respect to FIG. 14. Such ETA can be shared according to the disclosure relating to the method of FIG. 14, and the user interface depicted in FIG. 17.

Figure 14:
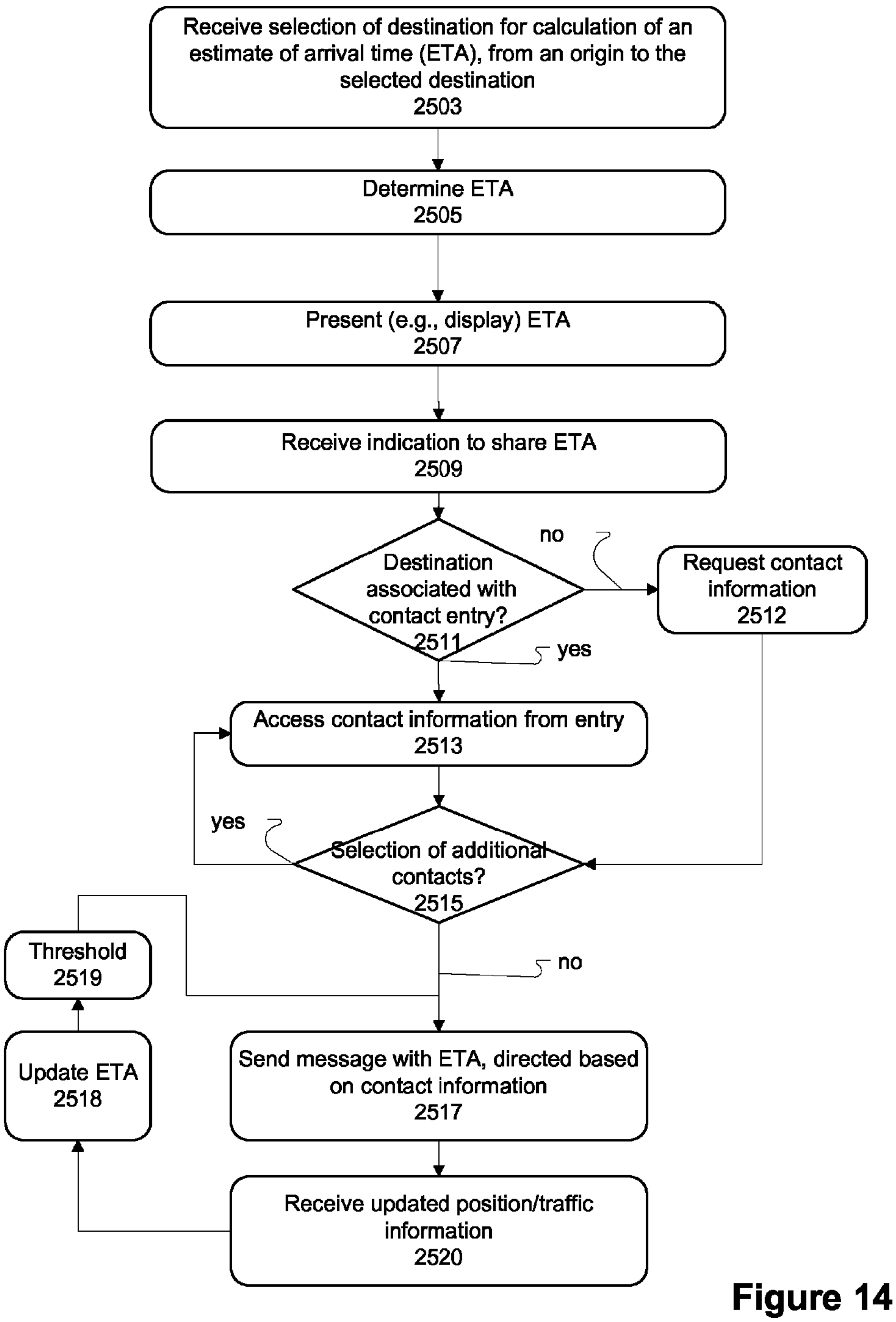
FIG. 14 depicts a method for sending ETA information to contacts.

Turning first to FIG. 14, its method is described below. A selection of destination, and calculation and display of ETA can be conducted (2503, 2505, 2507), either by selection of places, or by automatic selection, as described above. An indication to share the ETA can be received (2509). A determination (2511) of whether the destination is associated with an entry in a contact manager is made. If there is such an associated entry, then contact information from that entry is obtained (2513), and if not then contact information can be requested (2512) through the user interface. An option to select additional contacts can be provided (2515), which can cause acceptance of additional contacts. Upon determining contact information to which the ETA should be sent, messages can be sent (2517), directed to each contact informational element. For example, a Short Message Service message can be generated to be sent to phone numbers associated with the contact entry, and/or phone numbers supplied by a user through the interface. Other contact information can include e-mail addresses. The ETA estimate can be updated (2518), and a further message with that updated ETA can be sent to the contact identified by the informational element. The ETA can be updated based on one or more of updated position and traffic information (2520). The sending of an updated ETA can be conditioned based on a threshold (2519), such that the ETA must change by at least a defined amount before an update message is sent.

Figure 17:
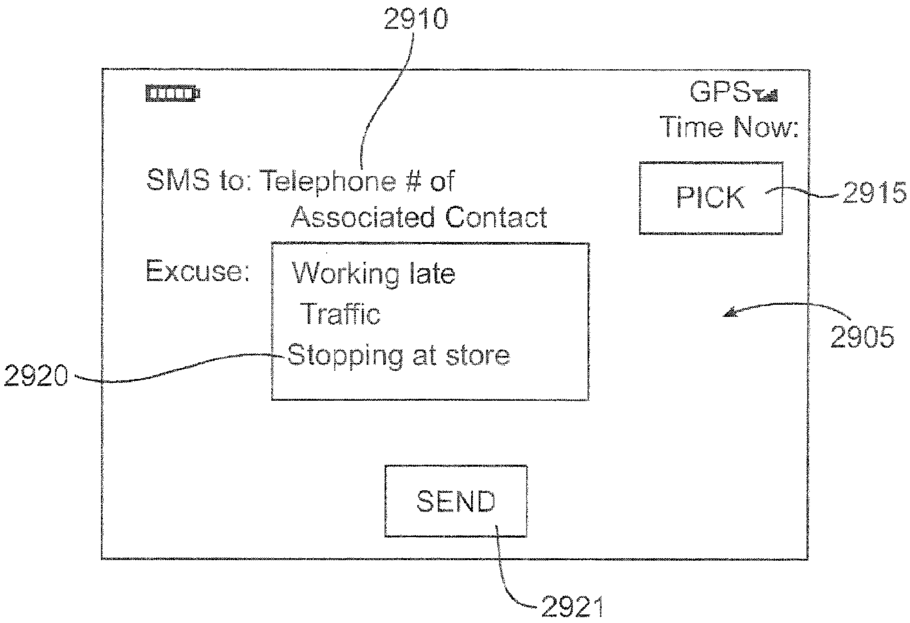
FIG. 17 depicts an example user interface element that can be provided with the method of FIG. 14.

The user interface element 2905 of FIG. 17 depicts that a default operating procedure can be that an SMS message is sent to a phone number associated with the contact (2910), while a Pick 2915 button allows the option to select additional phone numbers. An excuse window 2920 can be provided, which allows a reason to be included in the message as to why the ETA may be different from what was expected. An optional send button 2921 allows confirmation of the selections before the messages with the ETA information are sent.

Such aspects can include automatic production/sending of supplemental/periodic update notifications based on a variety of conditions or parameters, including elapsed time, proximity to POI, departures from the route, or re-selections. For example, updates can be made hourly, or when passing a given point. The user interface can be modified or a user interface provided that provides user-selectable options, which can have defaults for such parameters and conditions.

The various examples described above are provided by way of illustration only and should not be construed as limiting. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. Disclosure of memories and other examples of computer readable medium provide for tangible computer readable media that store information as specified. Processors can be implemented in a variety of ways, including processors that are fully programmable with software, and combinations of fixed function and software-programmable processing elements. Different implementations may call for a different mixture of processing elements, and selection therefrom for a particular implementation can be performed by those of ordinary skill in the art.

Although the above has been described with reference to certain specific embodiments, various modifications thereof will be apparent to those skilled in the art as outlined in the appended claims. Also, disclosure of certain techniques or examples with respect to a subset of the disclosures or examples herein does not imply that such techniques or examples pertain only to those disclosures, but rather such selective disclosures are made for the sake of clarity, to avoid obscuring principal teachings of the disclosure.

What is claimed is:

1. A method implemented on a first device, comprising:

rendering, by a processor of the first device, an interface comprising a selectable option to send a message comprising an estimate of an arrival time at a destination;

receiving, by the processor, input indicative of selection of the option; and responsive to receiving the input indicative of the selection, the processor sending a message with the arrival time estimate for transmission on a network to a second device associated with a recipient identified based on stored data associating the recipient with the destination.

2. The method of claim 1, further comprising rendering, by the processor, the interface as a single selectable button, which causes provision of the input, and the sending of the arrival time estimate.

3. The method of claim 1, further comprising rendering, by the processor, an option on the interface to select an additional recipient of the arrival time estimate.

4. The method of claim 1, further comprising rendering, by the processor, an option to send the arrival time estimate to a different recipient than the recipient identified based on the data associating the recipient with the destination.

5. The method of claim 1, wherein the recipient is associated with the destination through stored data contained in a contact stored in a contact manager.

6. The method of claim 1, wherein the recipient is associated with the destination by association of one or more of an e-mail address and a phone number of the recipient with the stored data or the destination.

7. The method of claim 1, wherein the arrival time estimate is calculated based on information relating to traffic conditions on a route between a location of the first device to the destination.

8. The method of claim 1, further comprising producing, by the processor, an updated arrival time estimate and producing an update message comprised the updated arrival time estimate for transmission on the network to the second device associated with the recipient identified based on the stored data associating the recipient with the destination.

9. A non-transitory computer readable medium storing computer executable instructions for performing a method, comprising:

rendering an interface on a first device, the interface comprising a selectable option to send a message comprising an estimate of an arrival time at a destination;

receiving input indicative of selection of the option; and responsive to receiving the input indicative of the selection, determining the arrival time estimate to be sent and providing a message with the arrival time estimate for transmission on a network to a second device associated with a recipient identified based on stored data associating the recipient with the destination.

10. The non-transitory computer readable medium of claim 9, wherein the method further comprises accessing one or more metrics of traffic congestion on a route from an origin to the destination, and using those metrics in calculating the arrival time estimate.

11. The non-transitory computer readable medium of claim 9, wherein the method further comprises automatically sending an updated estimate of the arrival time, upon determining that the arrival time estimate has changed by more than a threshold.

12. A first device, comprising:

a processor module of the first device;

an interface to a wireless network; and a non-transitory computer readable medium storing computer readable data identifying one or more destinations and contact information associated with each of the one or more destinations, and computer executable instructions for programming the processor module to perform a method comprising:

identifying a destination, producing an estimate of an arrival time at the destination, and sending, to a second device, a message with the estimate of the arrival time, addressed based on the contact information associated with the identified destination, over the interface to the wireless network.

13. The first device of claim 12, wherein the non-transitory computer readable medium further stores instructions for programming the processor module to receive traffic information and for using the received traffic information in producing the estimate of the arrival time.

14. The first device of claim 12, wherein the non-transitory computer readable medium further stores instructions for programming the processor module to provide an interface that allows the destination to be selected from a list of destinations.

15. The first device of claim 12, wherein the non-transitory computer readable medium further stores instructions for programming the processor module to provide an interface as a selectable button, which causes the sending of the message.

16. The first device of claim 12, wherein the non-transitory computer readable medium further stores instructions for programming the processor module to provide an option on an interface to select an additional recipient of the arrival time estimate.

17. The first device of claim 12, wherein the non-transitory computer readable medium further stores one or more of an e-mail address and a phone number as the contact information.

18. The first device of claim 12, wherein the non-transitory computer readable medium further stores instructions for programming the processor module to calculate the arrival time based on information relating to traffic conditions on a route between a location of the first device to the destination.

19. The first device of claim 12, wherein the non-transitory computer readable medium further stores instructions for programming the processor module to produce an updated arrival time estimate and an update message comprising the updated arrival time estimate for transmission over the interface.

* * * * *